Dec. 6, 1938.   F. S. DOBSON   2,139,261
WHEELED SCRAPER
Filed March 16, 1936   2 Sheets-Sheet 1
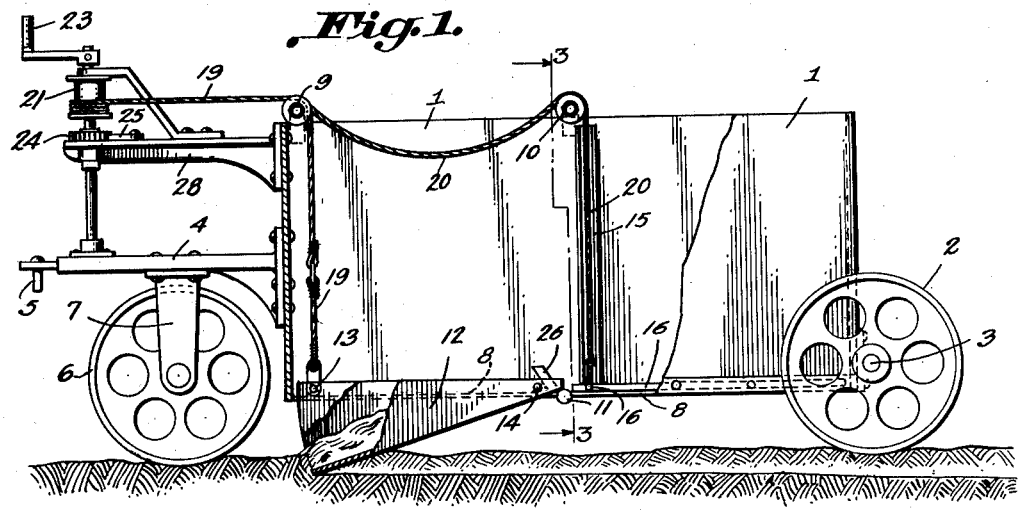
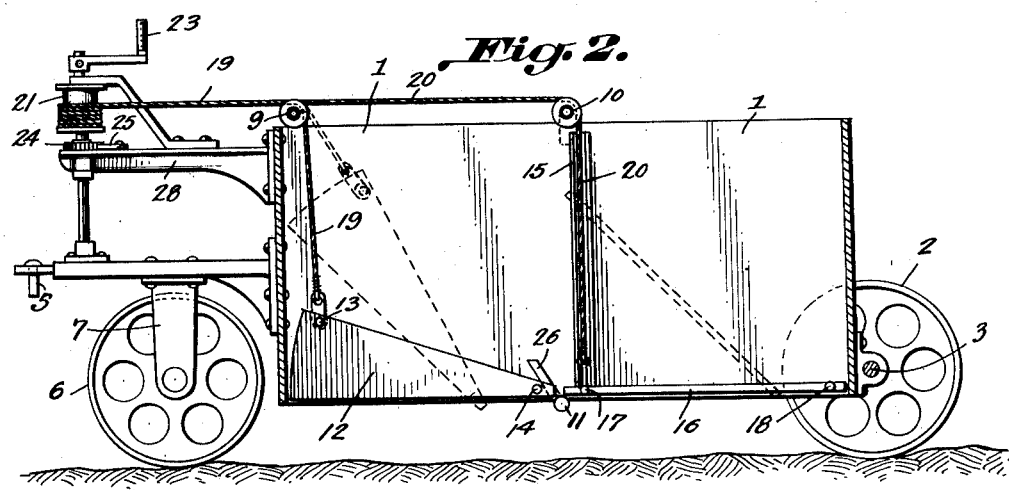
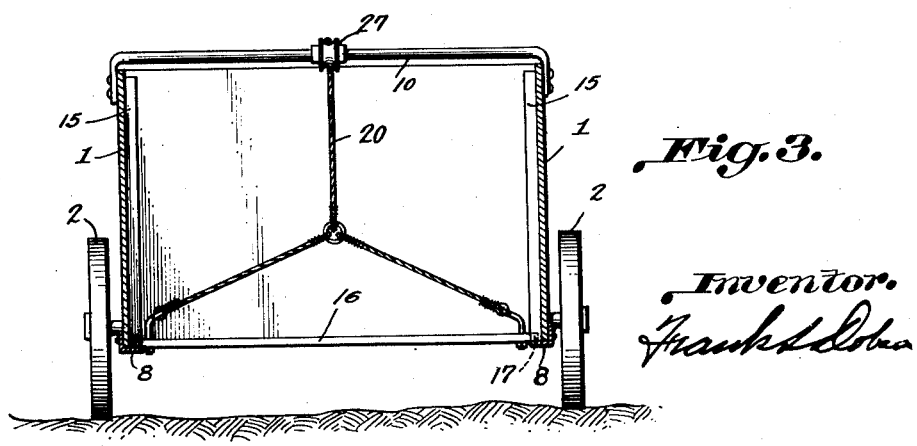
Inventor.
Frank S. Dobson Dec. 6, 1938.   F. S. DOBSON   2,139,261
WHEELED SCRAPER
Filed March 16, 1936   2 Sheets-Sheet 2

Inventor.
Frank S. Dobson

Patented Dec. 6, 1938

2,139,261

UNITED STATES PATENT OFFICE 2,139,261

WHEELED SCRAPER

Frank S. Dobson, Lincoln, Nebr.

Application March 16, 1936, Serial No. 69,006

3 Claims. (Cl. 37—124)

The present invention is an improved wheeled scraper that can be attached to any type tractor or truck and operated by said tractor or truck operator.

The objects of the improvements are:

First, to provide a four sided scraper box as one unit with immovable sides or ends to which the wheels, hitch, and all other movable parts may be attached, thereby doing away with a heavy frame structure.

Second, to provide a means of loading the scraper through its bottom by moving only a part of its bottom.

Third, to provide a means of unloading all the material from the scraper, through its bottom, at once, or part of the load at different places, by moving only a part of its bottom.

Fourth, in the case of large scrapers, to provide a means of loading the scraper more quickly, by using any number of its bottom sections for loading purposes.

Figure 4:
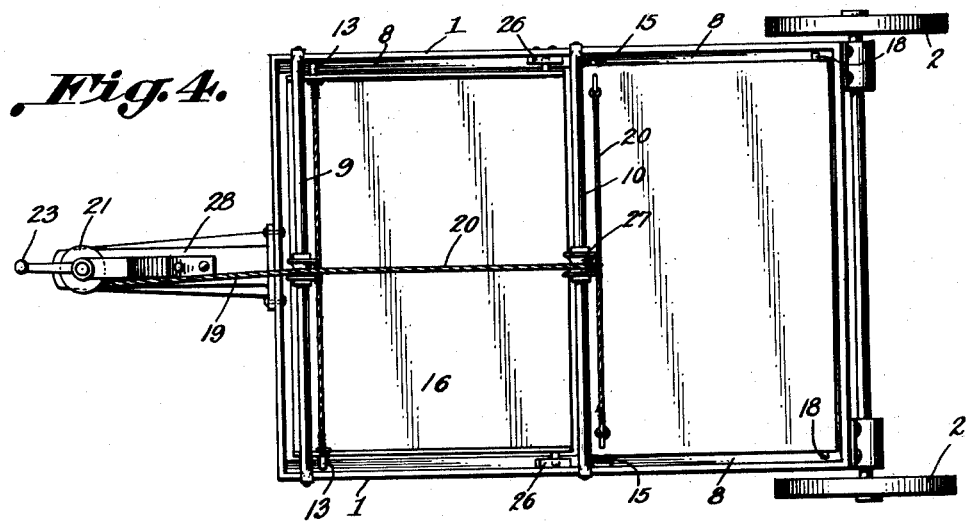
Figure 5:
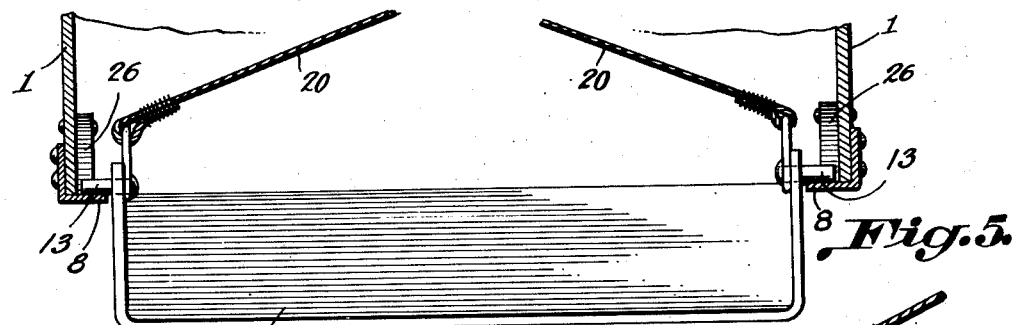
Figures 6, 7:
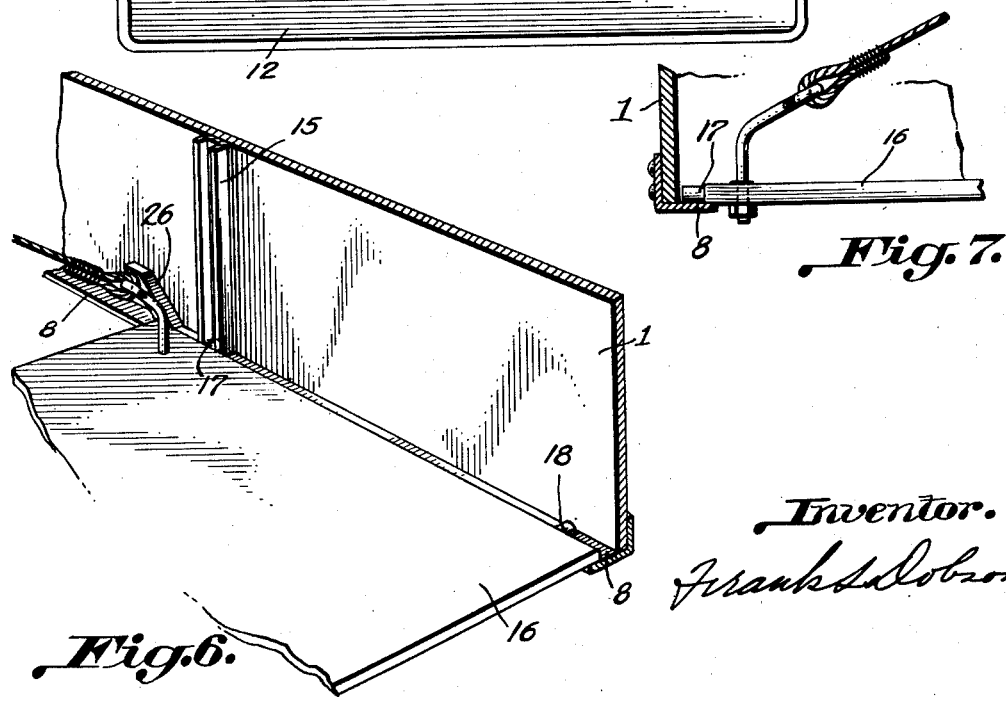

One form of the invention is illustrated in the accompanying drawings in which Figures 1 and 2 are vertical longitudinal sectional views of a small scraper, with the bottom cut in two sections or slats as it appears after one side is removed. Figure 3 is a sectional view taken on line 3—3 of Figure 1 looking in the direction of the arrows. Figure 4, a plan view. Figure 5, an enlarged detail of bucket 12 and its attachments. Figures 6 and 7 are enlarged details of guides 15, and plate 16 with its attachments.

A four sided box 1 without top or bottom has two rear wheels 2, 2 attached by an axle 3 to the rear end and outside of the box. A beam or bar 4 is attached rigid to the front end and ouside of box 1. In the case of a two wheeled scraper, the front end of bar 4 is attached to the rear hitch of any tractor by pin 5 in such a way that it will support the front end of box 1 and the scraper will move on its two rear wheels. In the case of a three wheeled scraper, wheel 6 is attached to bar 4 by swivel 7, Figure 1, the wheel 6 will support the front end of box 1 and the front end of bar 4 is attached to the rear hitch of any tractor in any manner and the scraper will move on its three wheels 2, 2 and 6.

In the case of a four wheeled scraper (not shown in the drawings) the fifth wheel common to all four wheeled vehicles is attached to bar 4 to which the two front wheels of the scraper are attached through a front axle. The towing vehicle is attached to the front axle.

Along the bottom and inside of the two sides of box 1 square, rectangular or angle bars 8, 8 are attached to box 1. Across the top of box 1, hollow pipes or round bars 9 and 10 with each end flattened and bent down are attached one end on each side and outside of box 1. Across the bottom of box 1 a hollow pipe or round bar 11, having both ends flattened and bent up, is attached to the outside of box 1 so that part of the diameter of pipe 11 extends above the bottom of box 1, pipe 11 being flatened also where it contacts bars 8, 8.

Bucket 12 has a bottom and two special shaped sides as shown in Figures 1, 2 and 5, but has no ends or top, its outside width being the same as the distance between the two opposite inside edges of bars 8, 8. The length of bucket 12 is such that the front edges of the bottom and sides engage the inside faces of the front end of box 1 in any position and the rear end of bucket 12 will rest on pipe 11.

Round stub shafts 13, 13 are attached one near and outside of each upper front corner of the two sides of bucket 12 and extend outward to contact the inside face of the two opposite sides of box 1.

Round stub shafts 14, 14 are attached in the same manner as shafts 13, 13, but near the upper rear corners of the two sides of bucket 12.

Guides 15 are square or rectangular bars attached to the inside face of the two opposite sides of box 1 and slightly back of pipe 11; the bottom of guides 15 rests on bars 8, 8 and extend upward to a point near the top of box 1. The thickness and width of guides 15 are less than the width and thickness of bars 8, 8.

Flat plate 16 rests on bars 8, 8, its width allows it to contact guides 15, its length is such that its front end rests on pipe 11 and its rear end contacts the inside face of the rear end of box 1. Round stub shafts 17, 17 are attached one near each of the front corners of plate 16 and extend outward to contact the two opposite sides of box 1 and between the four guides 15 and stub shafts or bars 18, 18 are attached one near each rear corner of plate 16 and extend outward to contact the inside face of the two sides of box 1.

A cable, rope or chain 19 is attached to both shafts 13, 13 and extends up and over pipe 9 (Figures 1, 2, and 4) and thence to a windlass 21 (Figure 1).

A cable, rope or chain 20 is attached to shafts 17, 17 and extends up and over pipe 10 (Figures 1, 2, 3, and 4) thence to rope 19 (Figures 1, 2, 3, and 4) to which rope 20 is attached so that it will hang loose while bucket 12 is digging (Figure 1) and will be taut when the bottom of bucket 12 is level with the bottom of box 1 (Figure 2).

There are numerous devices on the market for winding and unwinding rope 19 that may be set either on the scraper or tractor within easy reach of the tractor operator and operated by him either by hand or from a power take off direct from the tractor engine.

I do not claim anything new in a windlass, but to show how my scraper operates, I show in Figure 1 a simple windlass 21 to which the upper end of chain 18 is attached. Windlass 21 is turned by shaft 22 which is turned by crank 23 and windlass 21 is held in any position by sprocket 24 and dog 25.

Figure 1 shows the position of the scraper while it is being loaded, bucket 12 is lowered until it engages the material to be loaded, rope 20 slackens and hangs loose, the front edge of the bottom of bucket 12 is sharpened and as the scraper is pulled forward by the tractor, bucket 12 cuts and picks up the loose material which is forced back onto plate 16 and into and filling up box 1. To prevent bucket 12 being forced back out of place while it is digging, square or rectangular bars or lugs 26, 26 are attached to the inside face of each side of box 1 and just back of but contacting shafts 14, 14 and at the proper angle to prevent the rear end of bucket 12 from being forced back or upward, (Figures 1, 2, 4, 5, and 6).

When box 1 is filled, windlass 21 is turned, winding up cable 19, taking up the slack in rope 20 and raising the front end of bucket 12. When the bottom of bucket 12 is level with the bottom of box 1 and bars 8, 8, windlass 21 is locked in place by dog 25 and the scraper is ready to be moved to the place of unloading (Figure 2) both ropes 19 and 20 being taut.

When the place of unloading is reached, windlass 21 is again turned, winding up both ropes 19 and 20 and raising the front ends of buckets 12 and plate 16, the front end of bucket 12 will contact the front side of box 1 and move up, but shafts 14, 14 will contact bars 8, 8 and slide forward. Shafts 17, 17 will contact guides 15 forcing the front end of plate 16 to raise up while the rear end of plate 16 contacts bars 8, 8 and slides forward. This creates openings in the bottom of box 1 allowing the material to slide out as shown in dotted lines in Figure 2.

When all the material is unloaded, windlass 21 is locked in place by dog 25 (Figure 2) and the scraper moved to the place of loading again.

The ends of shafts 13—13, 14—14, 17—17 and 18—18 contact the inside face of box 1 at all times, holding bucket 12 and plate 16 in the correct sideway position.

When the scraper reaches the place of loading again, dog 25 is raised, freeing shaft 22 and windlass 21 and the weight of bucket 12 and plate 16 will cause windlass 21 to unwind itself.

Bucket 12 being released, its own weight will force it down, but its front edge contacts the inside face of the front end of box 1, causing the front of bucket 12 to fall or slide straight down, but shafts 14, 14 contact bars 8, 8 and cannot move down, but are forced to slide rearward until they contact lugs 26, 26. The front end of bucket 12 will continue to fall downward until it reaches the ground, shafts 13, 13 are set high enough above the bottom of bucket 12 that they will not contact bars 8, 8 at any time while the scraper is digging.

Also, when dog 25 is raised, releasing windlass 21, the weight of plate 16 will cause it to fall downward, but shafts 17, 17 contact guides 15 and cause the front end of plate 16 to fall straight down until shafts 17, 17 rest on bars 8, 8. The rear end of plate 16 contacts bars 8, 8 at all times and cannot move downward, but is forced to slide rearward until it contacts the rear end of box 1 (Figure 2). The front end of bucket 12 can be raised or lowered for deep or shallow digging at any time by turning crank 23.

When needed, idlers 27 (Figure 4) can be set over pipes 9 and 10 for cables 19 and 20 to roll on. Where desired, grooves can be cut in both sides of box 1 instead of attaching guides 15 to engage shafts 17, 17.

For large scrapers the bottom of box 1 may be cut in several sections and any number of buckets 12 or plates 16 may be used, enabling quicker loading and unloading of the scraper.

Where desired, separate windlasses can be used, one for each bucket 12 and one for each plate 16 operated independent or together.

Where the windlass is set on the tractor, crank 23, sprocket 24 and dog 25 are removed and two revolving shafts 22, 22 are set side by side on bar 4 and through bar 28, one shaft 22 on each side of cable 19, allowing cable 19 to bend with the tractor as the tractor turns right or left.

Material left on bars 8, 8 after the scraper is unloaded which might interfere with the operation of buckets 12 and plate 16 will be scraped off by shafts 14, 14 and the rear end of plate 16 as they slide back and forth, but holes may be cut in bars 8, 8 where shafts 14, 14 contact lugs 26, 26 and where shafts 17, 17 rest on bars 8, 8 and that part of bars 8, 8 that are not scraped clean to allow the escape of the material.

Where desired, instead of using bars 8, 8, the two sides of box 1 may be wider than its two ends and the extra width bent at right angles at the bottom of the two sides of box 1 thus taking the place of and doing away with bars 8, 8.

Where desired to allow the material to pass over bucket 12 and into box 1, faster, the bottom part of the front end of box 1 may be cut out to any height desired above the bottom of box 1 up to the hitch 4; bucket 12 will necessarily be lengthened to operate as heretofore described.

I claim:

1. A carrying scraper having sides, front, and back rigidly connected together to form a rigid bowl, supported in fixed elevation from the ground by ground engaging members, a bottom formed in sections, one end of each section mounted to slide along the lower edges of the bowl, means supporting the other end of each section to hold it in closing relation to the bottom of the bowl, and to raise the end to discharge the load through the opening formed by the sliding movement of the other end and the front end of the forward section being formed as a scoop to scoop material from the surface of the ground when lowered by its supporting means.

2. A carrying scraper having sides and back rigidly connected together to form a rigid bowl, supported in fixed elevation from the ground by ground engaging members, a bottom formed in sections, one end of each section mounted to slide along the lower edges of the bowl, means supporting the other end of each section to hold it in closing relation to the bottom of the bowl and to raise the end to discharge the load through the opening formed by the sliding movement of the other end and the front end of the forward section being formed as a scoop to scoop material from the surface of the ground when lowered by its supporting means.

3. A scraper comprising a traction mounted dirt holding body, separate front and rear bottom plates in the body normally forming a continuous load supporting surface, a horizontally movable pivot mounting for the rear end of the front plate, means applied to said plate to swing the same about said pivot mounting, and means guiding the plate so that with upward swinging movement thereof from a normal position, the pivot mounting will move forwardly.

FRANK S. DOBSON.